Sept. 29, 1970     A. R. MABIE ET AL     3,531,118

LAP COUNTER FOR VEHICULAR RACING GAME

Filed April 25, 1966     2 Sheets-Sheet 1

INVENTOR.
ANDREW R. MABIE
MARION C. HUCKABY
BY Fishburn & Gold
ATTORNEYS

INVENTOR.
ANDREW R. MABIE
MARION C. HUCKABY
BY
ATTORNEYS

United States Patent Office 3,531,118
Patented Sept. 29, 1970

3,531,118
LAP COUNTER FOR VEHICULAR RACING GAME
Andrew R. Mabie, Prairie Village, and Marion C. Huckaby, Mission, Kans., assignors to Custom Control Manufacturer, Incorporated, Merriam, Kans., a corporation of Kansas
Filed Apr. 25, 1966, Ser. No. 545,016
Int. Cl. A63f 9/14
U.S. Cl. 273—86                               3 Claims

ABSTRACT OF THE DISCLOSURE

Sensing means responsive to the movement of a magnetic field in proximity thereto is positioned adjacent the track of a vehicular racing game arrangement having vehicles with electric driving motors therein receiving power through the track, the driving motor having a magnetic field associated therewith, and counting means are operatively connected to the sensing means and responsive to pulses created by the sensing means to indicate the completion of laps by the vehicles.

A timing circuit may be used to allot time for the race depending on the amount of money deposited in a coin switch.

---

This invention relates to an indicating and recording system and more particularly, to a new and improved system to indicate and record the presence of a moving magnetic field for utilization in such areas as vehicle racing arrangements, material handling equipment and the like.

A system which will indicate and accurately record movements of a magnetic field past a reference point regardless of variations in the velocity of the field as it passes said point may be employed in a variety of situations and equipment. For instance, in the slot car racing field, it is desirable to accurately record the number of laps completed by each of the individual cars on the tracks in such a manner as not to affect the performance of said vehicles. The vehicles on tracks of this nature may pass a reference point at a scale speed of approximately 170 miles per hour making recordation of the completed lap quite difficult. Various systems have been employed for this purpose, such as: mechanical trip switches which the vehicle strikes to activate a recordation means, said switches being difficult to set for proper operation as their closing distance is critical and said switches are often missed by skidding or fishtailing vehicles thereby failing to close the swtch and failing to record the passage of the vehicle; photocells for actuating a recording device, said cells being quite sensitive to the high intensity lighting required in racing facilities of this type and to foreign matter such as dust, both of said factors contributing to system malfunction; a dead section in the track which activates a switch to actuate a recording means has been used, but such a switching means materially affects the vehicular performance as power is cut from the vehicle within this portion of the track, causing the vehicle to coast or if the vehicle lacks sufficient velocity before encountering said track section the vehicle may come to a complete stop on the track.

The principal objects of this invention are to provide a new and improved system for accurately indicating and recording the passage or movement of a magnetic field by a reference point, thereby alleviating the aforementioned difficulties in the art; to provide such a system which will accurately indicate and record the movement of a magnetic field past a reference point in a manner relatively independent of the velocity of the moving magnetic field; to provide such a system including circuitry containing a field sensitive means operatively connected to a relay means, said relay means being responsive to a pulse received in said field sensitive means, said circuitry providing means to effect a sufficient time lapse after the receipt of the pulse of energy in the field sensitive means for the growth of sufficient operating current to activate the relay means and maintain the relay means in a predetermined condition in order to activate a second circuit such as counting circuitry for recordation of the passage of the magnetic field by a reference point; and to provide such a system for use as a lap counter on a slot car raceway to record the completion of a lap by an individual racing vehicle.

This invention contemplates the utilization of a sensing system having a sensing means responsive to the movement of a magnetic field within a predetermined distance from said sensing means with said sensing means operatively connected to a counter or indicating means, said counter or indicating means being responsive to said sensing means to indicate and record the movement of a magnetic field past said sensing means. The invention further contemplates the utilization of an induction means as a magnetic field sensing means wherein the moving magnetic field develops a potential across said induction means to effect the issuance of a pulse within a circuit operatively connected to said induction means, the amplitude and duration of said pulse being primarily dependent upon the velocity and intensity of the magnetic field developing the potential across said induction means.

The invention further contemplates the employment of various means in said sensing system which will, in response to the pulse, activate an indicating or counting means in a manner relatively independent of the velocity at which the magnetic field passes the induction means. In order to accomplish this, the invention contemplates the utilization of a means to control the discharge of the induced voltage into a gating circuit, with said gating circuit effecting a flow of current from a power input means to an amplifying stage or circuit which, in turn, and responsive to the current flow in the gating circuit, effects a flow of current through indicating or counting means of a sufficient time duration to activate said means to record or indicate the passage of the magnetic field past the induction means. It is contemplated that the amplifier stage will be operatively connected to the gating circuit through a means for creating a time lag between the closing of the gating circuit and the stoppage of current flow through the counting or indicating means.

Other objects and advantages of this invention will become apparent from the following description taken in connection with the accompanying drawings, wherein are set forth by way of illustration and example certain embodiments of this invention.

FIG. 1 is a plan view illustrating a vehicular racing arrangement of the type normally employed for slot car racing wherein a system for indicating and recording the passage of a magnetic field past a reference point embodying the features of this invention may be utilized as a lap counter for vehicles in movement upon the racing arrangement, said vehicles having a magnetic field associated therewith.

Figure 1:
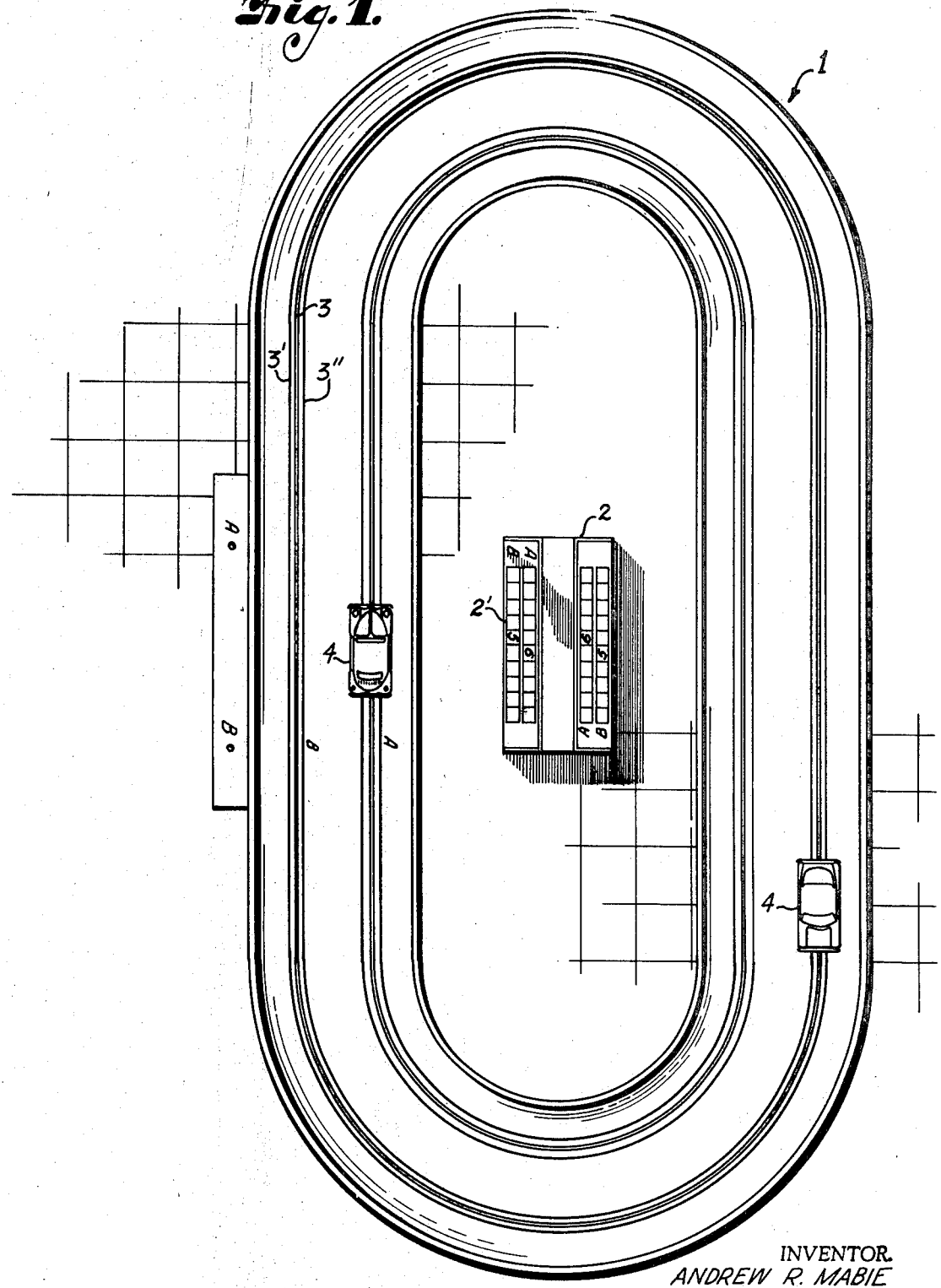

Referring to the drawings in more detail:

The reference numeral 1 generally refers to a vehicular racing arrangement of the slot car variety normally employed in a slot car racing center, said vehicular racing arrangement 1 employing a lap counting system 2 embodying the features of this invention for indicating and recording the completion of a lap about the track 3 of the racing arrangement 1. Each track 3 has a pair of conductors 3' and 3" that extend along the path of the car thereon and are connected in circuit with a source of electric power (not shown) in a conventional manner so said conductors can furnish current to operate the cars. The counting system 2 including a light panel or other means 2' for visual expression to racers and spectators of the number of laps completed by each vehicle on the arrangement 1. A pair of vehicles 4 are illustrated on track 3 of arrangement 1, said vehicles 4 being of the conventional type utilized in slot car racing being driven by means of an electric motor 4' receiving power through track 3 by means of brushes or other means 5 which move in sliding engagement to the track conductors 3' and 3" as the vehicle 4 passes around the racing arrangement 1. The electric motor of the vehicle 4 creates a magnetic field which is utilized to activate the lap counting system 2 illustrated herein. The slot car racing arrangement 1 is exemplary only as it is illustrative of a raceway arrangement wherein individual racing vehicles having a magnetic field associated therewith are movable about a track and wherein a lap counting system 2 or a sensing system 7 embodying the features of this invention may be employed which is responsive to the movement of said magnetic field past a predetermined reference point to accurately indicate and record the completion of a lap by an individual racing vehicle.

Figure 2:
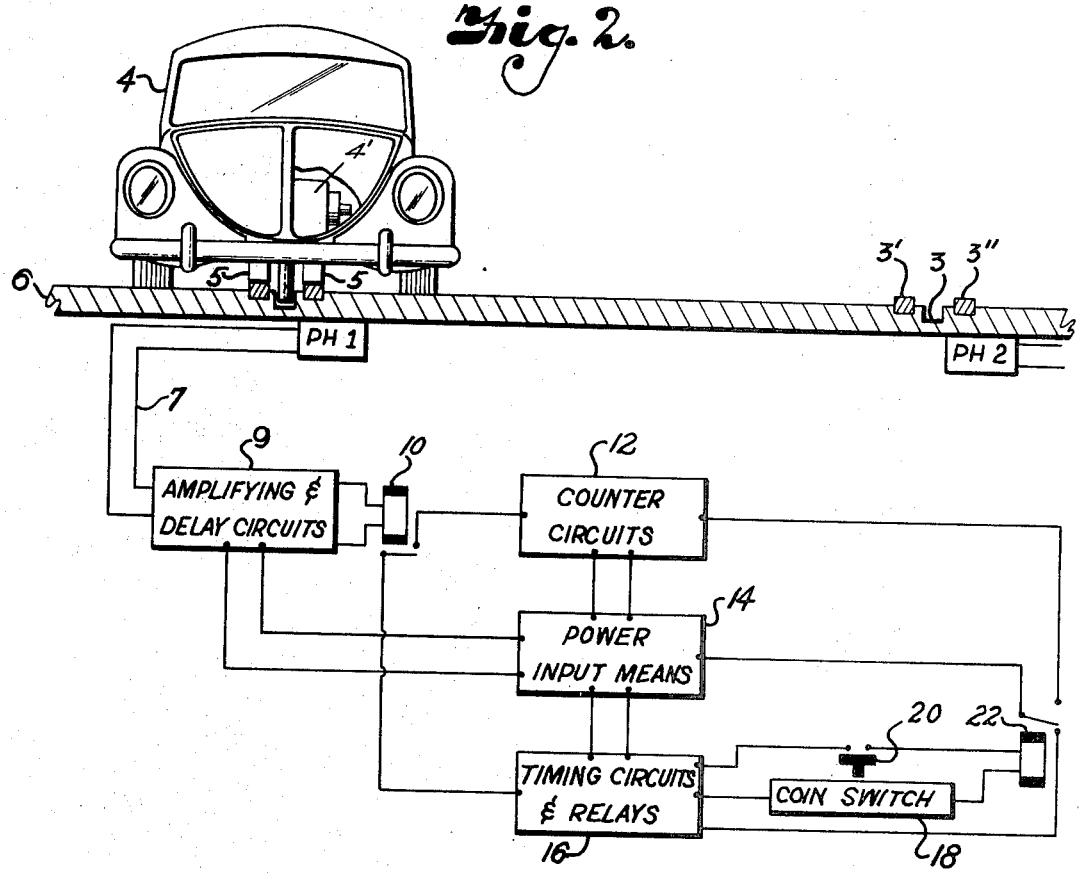
FIG. 2 is a diagrammatic view illustrating a system for indicating and recording the passage of a magnetic field by a reference point and particularly a lap counter for use in recording a lap completion for a vehicle having a magnetic field associated therewith.
Figure 3:
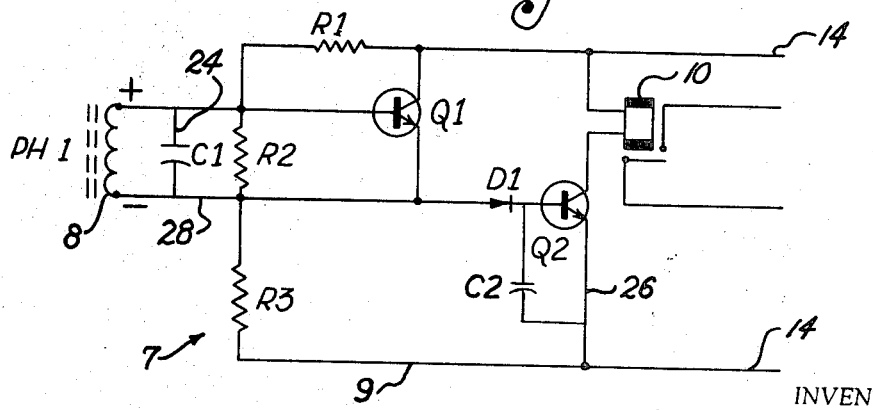
FIG. 3 is a schematic diagram of a sensing system embodying the features of this invention which is operable to sense the presence of a moving magnetic field and activate a means in response to said moving magnetic field.

In the illustrated embodiment, the racing vehicle 4 is propelled past a pickup head designated herein as PH1 thereby moving the magnetic field of the vehicle 4 past a sensing means in the pickup head PH1, said sensing means being responsive to the magnetic field of the moving vehicle 4 to initiate an indicating or counting action in the lap counting system 2. Referring to FIG. 2, a pair of pickup heads PH1 and PH2 are mounted in underlying relation to a supporting member 6 which serves to support a pair of tracks 3 with PH1 being operatively associated with one of said tracks 3 and PH2 being operatively associated with the other of said tracks 3. Each of the pickup heads PH1 and PH2, as illustrated, include an induction coil 8 across which a potential is developed by movement of the magnetic field of vehicle 4 within a predetermined range of said induction coil 8.

The induction coil 8 is illustrated as being operatively connected to amplifying and delay circuits 9 which serve to utilize or convert a pulse received from the induction coil 8 to actuate a means in response to current flow in the amplifying and delay circuits 9 illustrated herein as a relay means 10 in order to effect a current flow to counting circuits 12 to indicate and record the completion of a lap about the racing arrangement 1 by an individual vehicle 4. Both the amplifying and delay circuits 9 and the counting circuits 12 receive current flow from a power input means 14 operatively connected to each of said circuit systems 9 and 12. The counting circuits 12 are also operatively connected to a plurality of timing circuits and relays 16 which are employed in the operation of the slot car racing arrangement to commence the slot car racing upon the deposit of a coin activating a coil switch 18 and the depression of a get-set-go button 20 which serves to activate a relay 22 and reset the counting circuits 12 to a zero position such that a new race may be conducted and timed to allow the allotted time in response to the amount of money deposited. A similar system is provided for each of the racing tracks 3; however, only the system in relation to pickup head PH1 has been illustrated in FIG. 2 in order to make the figure more readily understandable. Various types of conventional counting circuitry may be employed to actually record the passage of the magnetic field past a reference point.

The induction coil 8 is operatively connected to a gating circuit or stage 24 with said gating circuit 24 being operatively connected to the power input means 14 and an amplifier circuit or stage 26, said amplifier stage 26 being operatively connected to the power input means 14 and the relay means 10 in order to actuate relay 10 in order to, in turn, actuate the counting circuits 12 to indicate and record the completion of a lap by vehicle 4 on the racing arrangement 1. In this manner, the pulse generated by the development of the potential across the induction coil 8 by movement of the magnetic field of vehicle 4 past the induction coil 8 is employed to actuate the counting circuits 12.

The gating circuit 24 includes a transistor Q1 illustrated as a NPN type transistor such as a 2N3569 transistor, said transistor Q1 being operable to control the flow of current from the power input means 14 to the amplifier stage 26 of the sensing system 7. A plurality of resistors R1, R2 and R3 are included in the sensing system 7 and are so selected in order to provide a nonconducting condition or null condition in the transistor Q1 until the gating circuit 24 is upset by the passage of a magnetic field by the induction coil 8. In the illustrated embodiment, R1 has a value of 220,000 ohms, R2 has a value of 22,000 ohms, and R3 has a value of 10,000 ohms. With the gating circuit 24 in its nonconducting condition, the passage of a magnetic field past the induction coil 8 would tend to upset the gating circuit 24 causing a current flow to the bias of transistor Q1 thereby effecting a current flow from the power input means 14 to the amplifier stage 26. When a magnetic field passes the induction coil 8 at a high velocity such as that experienced in the racing of vehicles 4 on slot car racing arrangements 1, the momentary potential created across the induction coil 8 and the pulse generated thereby is not normally sufficient to place the gating circuit 24 in a conducting condition through transistor Q1 to the amplifier stage 26 for a period of time sufficient for the relay means 10 to be operated to activate the counting circuits 12.

In order to increase the time period during which the transistor Q1 will conduct to the amplifier stage 26, an R-C circuit 28 has been operatively connected to the induction coil 8 in such a manner that the potential created across the induction coil 8 effects a build up of voltage in the capacitor C1, said capacitor C1 then discharging for a period of time in accordance with the basic formula $T=RC$. In the illustrated embodiment, the capacitor C1 has a value of .001 microfarad with R2 having a value of 22,000 ohms. The induction coil 8, as illustrated, has a soft iron center with 14,800 turns of No. 50 wire providing an induction coil having a resistance of 10,000 ohms. The connection of the R-C circuit 28 between the induction coil 8 and the base of transistor Q1 imposes a condition whereby the transistor Q1 is not operable to conduct current from the power input means 14 to the amplifier stage 28 until a potential is developed across R2, whereupon the discharge of C1 will effect the bias of the transistor Q1 such that transistor Q1 conducts from the power input means 14 to the amplifier stage 26. The transistor Q1 will continue to conduct until the stored energy in the capacitor C1 has been dissipated to the point where the potential is relieved across the resistor R2, thereby allowing the gating circuit 24 to return to a nonconducting state.

In analyzing the characteristics of the gating circuit 24, it is broadly stated that the circuit provides a pulse stretching means which means that if a magnetic field passes the induction coil 8 at a high velocity, the pulse created will be great in amplitude, but its width as a time factor will be very narrow, whereas a magnetic field passing the induction coil 8 at a slow velocity will produce a pulse having a low amplitude, but being relatively wide with regard to the time factor. The gating circuit 24 in cooperation with the amplifier stage 26 serves to equalize these two conditions in order to provide a sufficient current to the relay means 10 for a sufficient length of time in order to activate the armature of relay 10 and effect the operation of the counting circuits 12.

The amplifier stage or circuit 26 includes a transistor Q2 illustrated herein as a NPN type transistor such as a 2N3569 transistor which is employed to effect a current flow from the power input means 14 to the relay means 10 in response to a current flow through the gating circuit 24. The emitter of transistor Q1 is operatively connected to the base of transistor Q2 with the collector of transistor Q1 operatively connected to the power input means 14, thereby providing a current flow when Q1 is in its conducting condition from the power input means 14 to the base of transistor Q2, placing said transistor Q2 in a conducting condition. The collector and emitter of transistor Q2 are operatively connected to the power input means 14 with the collector, in the illustrated embodiment, being connected to the power input means 14 through the relay means 10 to provide a flow of current from the power input means 14 through relay 10 when transistor Q2 is placed in a conducting condition.

In order to further equalize the varying conditions caused by the varying velocities at which the magnetic fields pass the induction coil 8, a diode designated as D1 and capacitor C2 have been operatively connected between the emitter of the transistor Q1 and the base of the transistor Q2. The diode D1, which may be of a HGR1 variety, and capacitor C2 which has a value in the illustrated embodiment of 50 microfarads, provide a time lag between the stoppage of flow of current through transistor Q1, or the closing of the gating circuit 24, and the stoppage of current flow from the power input means 14 to the relay means 10 in order to secure sufficient operating time for the relay 10 to activate the counting circuits 12. D1 is also utilized to place the transistor Q2 in a non-conducting condition or state before and after the opening of the gating circuit 24 or the conduction of transistor Q1, the diode D1 has a small amount of voltage applied in the forward direction derived from current flow in R3, but the potential created is not sufficient to cause transistor Q2 to conduct when the gating circuit 24 is in a closed or nonconducting position.

In operation, the induction coil 8 is placed sufficiently close to the moving magnetic field, said spacing being dependent upon the characteristics of the induction coil 8, such that a potential will be created across the induction coil 8 when the magnetic field passes thereby. The potential created across the induction coil 8 induces a voltage in capacitor C1 which effects a voltage buildup and then a discharge across resistor R2. The discharge across resistor R2, in effect, stretching the pulse received from the passing magnetic field. The discharge across the resistor R2 upsets the balance of the gating circuit 24 causing transistor Q1 to conduct the amplifier stage 26 through the diode D1 and capacitor C2. The amplifier stage 26, in turn, due to the current flow from Q1 has its balanced condition upset and effects a flow of current from the power input means 14 to the relay means 10, thereby activating the counting circuits 12 to record the passage of the magnetic field or in the instance of slot car racing, the completion of a lap by a vehicle 4. Once the capacitor C1 has discharged to a certain point, the flow of current from the power input means 14 through transistor Q1 to the amplifier stage Q2 will cease; however, a time lag is produced by the diode D1 and capacitor C2. As the diode D1 conducts, the capacitor C2 charges to a peak value, then capacitor C2 discharges through the base and emitter elements of transistor Q2 to thereby maintain the amplifier stage 26 and the transistor Q2 in a conducting condition for an additional period of time, allowing sufficient operating time for the relay means 10 and the counting circuits 12 to act responsive to the current flow through the transistor Q2.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. In a vehicular racing game arrangement having a vehicular track, a lap counting system for indicating and recording lap completions by a vehicle having an electric driving motor therein receiving power through the track, said counting system comprising:
    (a) sensing means responsive to the movement of a magnetic field in proximity thereto to produce a pulse, said sensing means being positioned adjacent said track,
    (b) said driving motor producing said magnetic field, and
    (c) counting means operatively connected to said sensing means and responsive to said pulse to indicate the completion of laps by said vehicle.

2. The arrangement as recited in claim 1, wherein:
    (a) said sensing means includes means to increase the length of said pulse beyond the time of proximity of said field to said sensing means.

3. In a vehicular racing game arrangement having a vehicular track, a lap counting system for indicating and recording lap completions by a vehicle having an electric driving motor therein, said counting system comprising:
    (a) sensing means responsive to the movement of a magnetic field in proximity thereto to produce a pulse of electric current, said sensing means being positioned adjacent said track,
    (b) said driving motor producing said magnetic field, and
    (c) counting means operatively connected to said sensing means and responsive to said pulse to indicate the completion of laps by said vehicle.

References Cited

UNITED STATES PATENTS

| | | | |
|---|---|---|---|
| 2,188,619 | 1/1940 | Bernhardt | 273—86 |
| 2,548,495 | 4/1951 | Robins | 273—86 |
| 3,016,456 | 1/1962 | Corporon | 104—88 X |
| 3,120,389 | 2/1964 | Lombard | 273—86 |
| 3,231,275 | 1/1966 | Lombard | 273—86 |
| 3,331,604 | 7/1967 | Mentzer et al. | 273—54 |

ANTON O. OECHSLE, Primary Examiner

T. ZACK, Assistant Examiner

U.S. Cl. X.R.

235—92